US008422538B2

(12) United States Patent
Sheu

(10) Patent No.: US 8,422,538 B2
(45) Date of Patent: Apr. 16, 2013

(54) CHANNEL ESTIMATION METHOD FOR OFDM RELAYING SYSTEM

(75) Inventor: Jeng-Shin Sheu, Yunlin County (TW)

(73) Assignee: National Yunlin University of Science and Technology, Douliu, Yuniin County (TW)

(*) Notice: Subject to any disclaimer, the term of this patent is extended or adjusted under 35 U.S.C. 154(b) by 355 days.

(21) Appl. No.: 12/886,028

(22) Filed: Sep. 20, 2010

(65) Prior Publication Data

US 2012/0069872 A1 Mar. 22, 2012

(51) Int. Cl.
*H04B 3/36* (2006.01)

(52) U.S. Cl.
USPC .......................................... 375/211; 370/315

(58) Field of Classification Search .................. 370/210, 370/331, 315, 400, 480; 375/211, 214, 260, 375/295, 298
See application file for complete search history.

(56) References Cited

U.S. PATENT DOCUMENTS

| | | | |
|---|---|---|---|
| 2006/0165066 A1* | 7/2006 | Campbell et al. | 370/352 |
| 2010/0271932 A1* | 10/2010 | Hwang et al. | 370/216 |
| 2012/0002753 A1* | 1/2012 | Annavajjala et al. | 375/298 |

OTHER PUBLICATIONS

Liu, et al., Channel Estimation for Amplify and Forward Relay in OFDM System, International Conference on Wireless Communications, Networking and Mobile Computing, Oct. 2008, pp. 1-4.
Patel, et al."Channel Estimation for Amplify and Forward Relay Based Cooperation Diversity Systems", IEEE Transactions on Wireless Communications, vol. 6, No. 6, Jun. 2007, pp. 2348-2356.

* cited by examiner

*Primary Examiner* — Leon-Viet Nguyen
(74) *Attorney, Agent, or Firm* — Muncy, Geissler, Olds & Lowe, PLLC

(57) ABSTRACT

A channel estimation method for an OFDM relaying system, which is based on an EM algorithm and applied to an AF OFDM relaying system, wherein channels from a source node to a relaying system and from the relaying system to the destination node in a wireless communication system are respectively estimated at the destination node. The channel estimation method of the present invention comprises steps of: constructing a system model; setting an expectation function; performing maximization processing; and performing iteration. The method of the present invention respectively estimates the channels from the source node to the relaying system and from the relaying system to the destination node, whereby are optimally combined the signals of the direct path (source-to-destination) and the signals of the relay path (source-to-relay and relay-to-destination) at the destination node.

8 Claims, 8 Drawing Sheets

CHANNEL ESTIMATION METHOD FOR OFDM RELAYING SYSTEM

FIELD OF THE INVENTION

The present invention relates to a channel estimation method, particularly to a channel estimation method for an OFDM (Orthogonal Frequency Division Multiplexing) in an AF (Amplify-and-Forward) relaying system used in wireless communication systems.

BACKGROUND OF THE INVENTION

The mobile communication technology constantly purchases improvements in quality and quantity to satisfy up-to-date requirements. In the next-generation mobile communication system, using relays in a wireless communication network is an emerging technology to expand the system coverage, increase the overall throughput, promote the transmission efficiency, and reduce the propagation loss between a base station and a mobile station, whereby is effectively saved the transmission power of the mobile station and greatly prolonged the run time of batteries of the mobile station. If the relaying system is appropriately disposed on the boundaries of the base station coverage or the areas having a serious shadowing effect, the base station can provide uniform data rate coverage for users at different locations within the coverage. The relaying system is also used to realize transmit diversity. Owing to the transmission characteristics of the wireless channels, the destination receives signals from a direct path (source-to-destination) and a relay path (source-to-relay and relay-to-destination). The signals (carrying the same data) from different paths are combined in the destination to obtain transmit diversity, whereby the signal quality is effectively improved in the destination. Further, the relaying system also can be applied to a cooperative diversity technology to overcome multi-path fading and shadowing, especially when the source, relaying system and destination are equipped with only one antenna.

The OFDM (Orthogonal Frequency Division Multiplexing) technology is an effective modulation method to effectively increase the bandwidth efficiency and prevent inter-symbol interference (ISI) between signals. The OFDM technology has been widely applied to various wired and wireless communication systems, such as IEEE 802.16e specification, 3GPP-LTE (Long Term Evolution) and WiMAX (Worldwide Interoperability for Microwave Access).

A relaying system may work in a DF (Decode-and-Forward) mode or an AF (Amplify-and-Forward) mode. In the DF mode, the relaying system receives signals from the source, decodes and encodes the signals, and forwards the encoded signals to the destination. In the AF mode, the relaying system amplifies the signals from the source and forwards the amplified signals to the destination. Compared with the DF relaying system, the AF relaying system is free of active elements for encoding. Therefore, the AF relaying system has the advantages of low cost, easy installation and small size.

Currently, the channel estimation methods for the OFDM-based AF relaying system have the following related technologies. C. S. Patel and G. L. Stuber disclosed an LMMSE (Linear Minimum Mean Square Error) channel estimation method in a paper "Channel Estimation for Amplify and Forward Relay Based Cooperation Diversity Systems", IEEE Trans. Wireless Commun., Vol 6, pp. 2348-2356, 2007. Fand Liu, Zhe Chen, Xin Zhang and Dacheng Yang disclosed a low rank MMSE channel estimation method in a paper "Channel Estimation for Amplify and Forward Relay in OFDM System", International Conference on Wireless Communications, Networking and Mobile Computing, October 2008, pp. 1-4, which is based on an SVD (Singular Value Decomposition) method and exempted from inverse operation of the channel correlation matrix.

However, they are only literatures focused on the estimation of the composite channel (source-to-relay-to-destination) at the destination. So far, they have not yet been methods able to estimate individual channels of source-to-relay and relay-to-destination. The difficulty of estimating individual channels is that the signal amplified by the relaying system and transmitted to the destination no more makes the channel and noise of the destination to be presented in a Gaussian distribution. In the conventional literatures, the channel estimation method is based on MIP (Multipath Intensity Profile), which is obtained by additionally consuming system resources.

As mentioned above, the destination has to combine the signals from the direct path (source-to-destination) and the relay path (source-to-relay and relay-to-destination) to obtain the transmit diversity and effectively improve the signal quality at the destination. However, to achieve an optimal combination, the destination needs individual channels of source-to-relay and relay-to-destination to calculate the combining coefficients needed for the optimal combination at the destination.

SUMMARY OF THE INVENTION

The primary objective of the present invention is to solve the problem that the conventional technology cannot estimate individual channels of source-to-relay and relay-to-destination.

To achieve the abovementioned objective, the present invention proposes a channel estimation method for an OFDM relaying system, which is based on an EM (Expectation Maximization) algorithm, wherein channel impulse responses from a source node to a relaying system and from the relaying system to the destination node in a wireless communication system are respectively estimated at the destination. The channel estimation method of the present invention comprises the following steps:

Step S1: Construct a system model, wherein a relay path adopts a two-hop path, and the system model constructs both models for signals from a source node to a relaying system and from the relaying system to a destination node in a TDM (Time Division Multiplexing) mode, wherein the signal output by the source node is expressed by $$x_n = (1/\sqrt{N})\sum_{k=0}^{N-1} d_k e^{j2\pi kn/N}, \quad 0 \le n \le N-1,$$

wherein N is the IDFT (Inverse Discrete Fourier Transform), and $d_k$ is the transmitted data symbol at the k-th channel sub-carrier, which is independent over sub-carriers. Let $h_l^r$ be the coefficients of the channel impulse responses from the source node to the relaying system, and $\{h_l^r, l=0, 1, \ldots, L_r-1\}$. The signal received by the relaying system is expressed by $$y_n^r = \sum_{l=0}^{L_r-1} h_l^r x_{n-l} + w_n^r$$

$$= (1/\sqrt{N})\sum_{k=0}^{N-1} H_k^r d_k e^{j2\pi kn/N} + w_n^r,$$

$$0 \leq n \leq N-1$$

wherein $H_k^r$ is the channel gain of the k-th sub-carrier, and $w_n^r$ is the received noise sample of the relaying system at the time instant n. The signal is amplified by a Fourier transform in the frequency domain. Then, the amplified signal is transmitted by an inverse Fourier transform in the time domain and expressed by $\{x_n^r, n=0, 1, \ldots, N-1\}$. The signal received by the destination node is expressed by $$y_n^d = \sum_{l=0}^{L_d-1} h_l^d x_{n-l}^r + w_n^d$$

$$= \frac{1}{\sqrt{N}} \sum_{k=0}^{N-1} \left(\sum_{l=0}^{L_d-1} h_l^d e^{-j2\pi kl/N}\right)$$

$$\left(\sum_{l'=0}^{L_r-1} h_l^r e^{-j2\pi kl'/N}\right) \alpha_k d_k e^{j2\pi kn/N} +$$

$$\frac{1}{\sqrt{N}} \sum_{k=0}^{N-1} \left(\sum_{l=0}^{L_d-1} h_l^d e^{-j2\pi kl/N}\right)$$

$$\alpha_k W_k^r e^{j2\pi kn/N} + w_n^d,$$

$$0 \leq n \leq N-1$$

wherein $h_l^d$ is the coefficients of the channel impulse responses from the relaying system to the destination node, and $\{h_l^d, l=0, 1, \ldots, L_d-1\}$, $w_n^d$ is the received noise sample of the destination at time instant n, and $\alpha_k$ is the amplification gain of the relaying system at the k-th sub-carrier, and $W_k^r$ is the noise component of the relaying system at the k-th sub-carrier.

Step S2: Set an expectation function, wherein an expectation setting unit is used to set the expectation function.

Step S3: Perform maximization processing, wherein a maximization processing unit is used to perform the maximization processing.

Step S4: Perform iteration, wherein iteration is undertaken between Step S2 and Step S3 until a predetermined iterative number is reached.

The present invention proposes an EM-based channel estimation method for an OFDM relaying system, wherein the coefficients of the channel impulse responses from a source node to a relaying system and from the relaying system to the destination node are respectively estimated at the destination node. In an AF relaying system, the coefficients of the channel impulse responses of a two-hop path can be estimated and obtained at the destination node. The present invention is exempted from calculating MIP (Multipath Intensity Profile), wherefore less resources are consumed in the present invention.

DETAILED DESCRIPTION OF THE PREFERRED EMBODIMENTS

Figure 1:
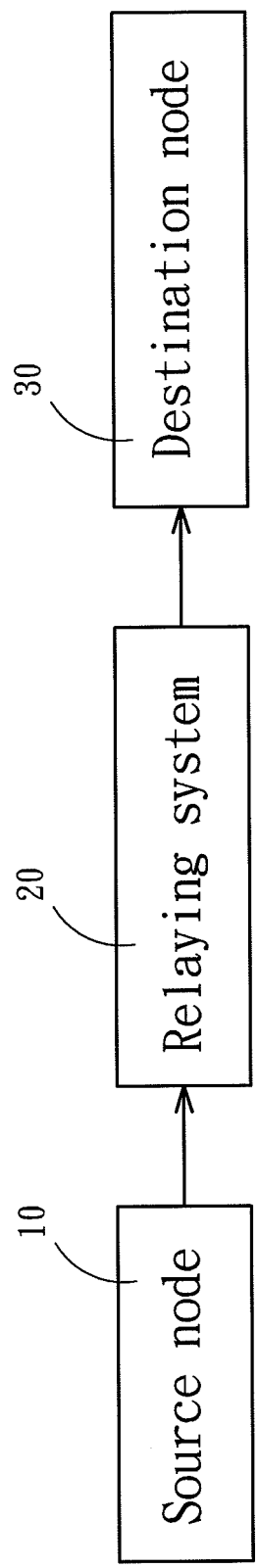
FIG. 1 is a diagram schematically showing an AF OFDM relaying system used in a wireless communication system.
Figure 2:
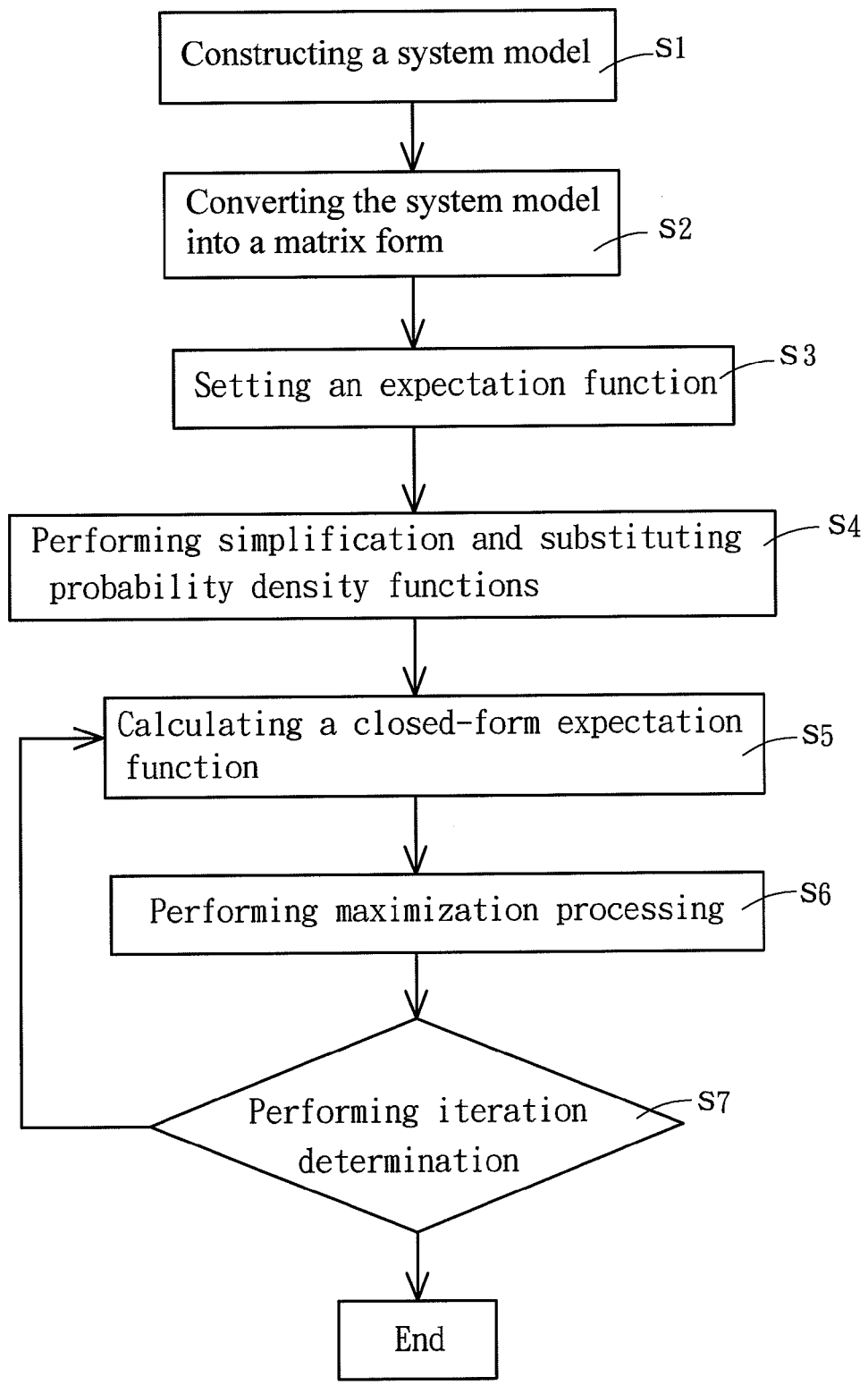
FIG. 2 is a flowchart schematically showing a channel estimation method for an AF OFDM relaying system according to one embodiment of the present invention.
Figure 3:
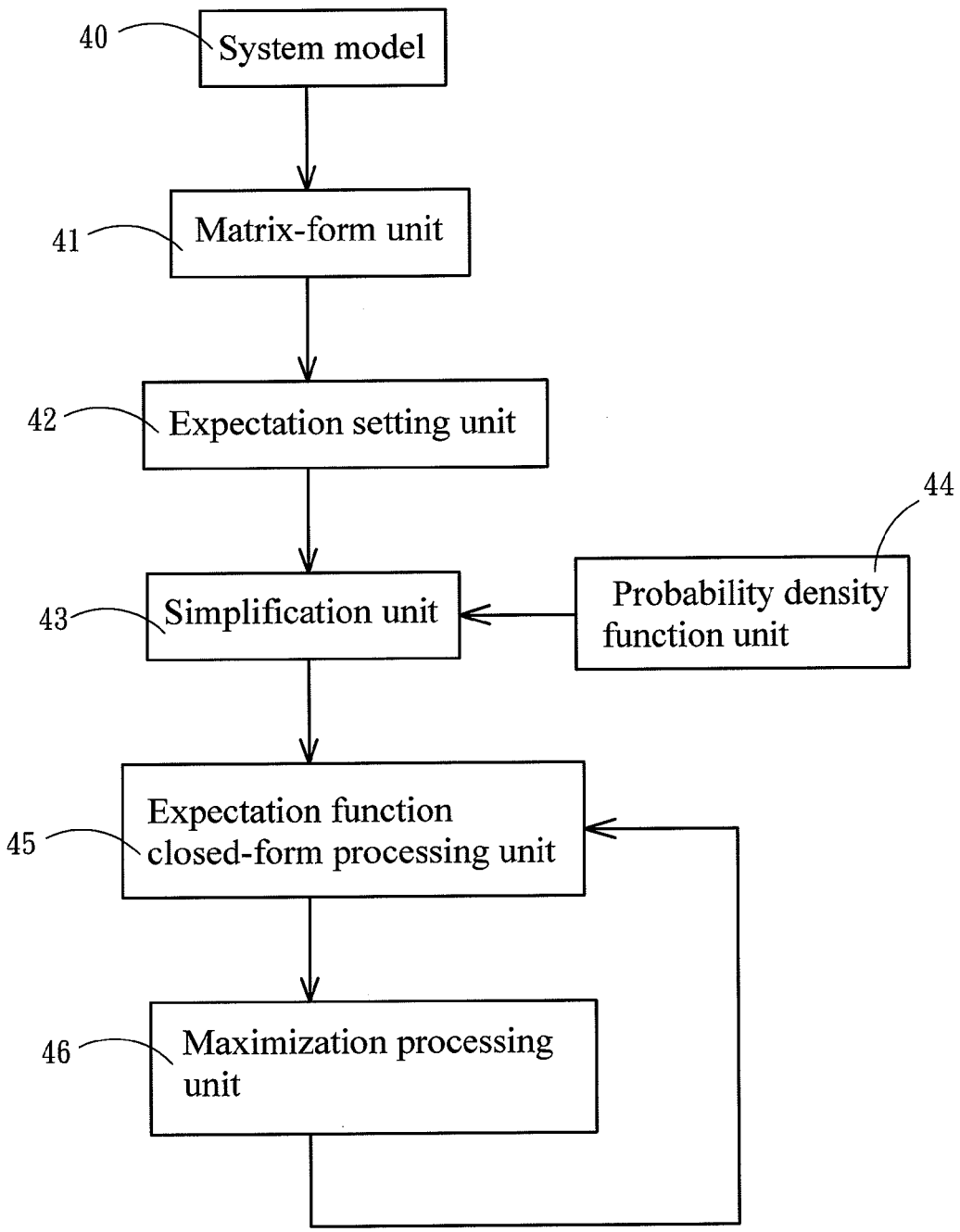
FIG. 3 is a diagram schematically showing the system architecture of a channel estimation method for an AF OFDM relaying system according to one embodiment of the present invention.

Refer to FIGS. 1-3. FIG. 1 is a diagram schematically showing an AF OFDM relaying system used in a wireless communication system. FIG. 2 is a flowchart schematically showing a channel estimation method for an AF OFDM relaying system according to one embodiment of the present invention. FIG. 3 is a diagram schematically showing the system architecture of a channel estimation method for an AF OFDM relaying system according to one embodiment of the present invention. The present invention proposes a channel estimation method for an OFDM relaying system, which is based on an EM (Expectation Maximization) algorithm, wherein channels from a source node 10 to a relaying system 20 and from the relaying system 20 to a destination node 30 in a wireless communication system are respectively estimated at the destination node 30. The channel estimation method of the present invention comprises the following steps:

Step S1: Construct a system model 40 with IDFT (Inverse Discrete Fourier Transform), wherein signal models from the source node 10 to the relaying system 20 and from the relaying system 20 to the destination node 30 are respectively constructed, and wherein the signal output by the source node 10 is expressed by $$x_n = (1/\sqrt{N})\sum_{k=0}^{N-1} d_k e^{j2\pi kn/N}, \quad 0 \leq n \leq N-1, \tag{1}$$

and wherein the signal received by the relaying system 20 is expressed by $$y_n^r = \sum_{l=0}^{L_r-1} h_l^r x_{n-l} + w_n^r \tag{2}$$

$$= (1/\sqrt{N})\sum_{k=0}^{N-1} H_k^r d_k e^{j2\pi kn/N} + w_n^r,$$

$$0 \leq n \leq N-1$$

and wherein the signal is amplified by a Fourier transform in the frequency domain, and the amplified signal is then transmitted by an inverse Fourier transform in the time domain and expressed by $$\{x_n^r, n=0,1,\ldots,N-1\},$$

and wherein the signal received by the destination node 30 is expressed by $$y_n^d = \sum_{l=0}^{L_d-1} h_l^d x_{n-l}^r + w_n^d \qquad (3)$$

$$= \frac{1}{\sqrt{N}} \sum_{k=0}^{N-1} \left( \sum_{l=0}^{L_d-1} h_l^d e^{-j2\pi kl/N} \right)$$

$$\left( \sum_{l'=0}^{L_r-1} h_{l'}^r e^{-j2\pi kl'/N} \right) \alpha_k d_k e^{j2\pi kn/N} +$$

$$\frac{1}{\sqrt{N}} \sum_{k=0}^{N-1} \left( \sum_{l=0}^{L_d-1} h_l^d e^{-j2\pi kl/N} \right)$$

$$\alpha_k W_k^r e^{j2\pi kn/N} + w_n^d,$$

$$0 \le n \le N-1$$

and wherein $\{h_l^r\}_{l=0}^{L_r-1}$ is the channel impulse responses from the source node 10 to the relaying system 20, and wherein $\{h_l^d\}_{l=0}^{L_d-1}$ is the channel impulse responses from the relaying system 20 to the destination node 30, and wherein $\alpha_k$ is the amplification gain of the relaying system 20 at the k-th sub-carrier. The characteristic of the two-hop path from the source node 10 to the relaying system 20 and from the relaying system 20 to the destination node 30 is obvious seen in Equation (3): The signals observed in the destination node 30 are respectively influenced by the channels from the source node 10 to the relaying system 20 and from the relaying system 20 to the destination node 30.

Step S2: Convert the system model 40 into a matrix form, wherein a matrix-form unit 41 converts Equation (3) into a matrix representation to simplify calculation:

$$y^d = [y_0^d, y_1^d, \ldots, y_{N-1}^d]^T \qquad (4)$$

$$= U^H A D \mathrm{diag}\{\tilde{U}_{L_r} h^r\} \tilde{U}_{L_d} h^d + U^H A W^r \tilde{U}_{L_d} h^d + w^d$$

wherein the superscripts $T$ and $H$ respectively represent a matrix transpose and a Hermitian transpose, and wherein U represents a discrete Fourier transform matrix, and wherein $\tilde{U}_L$ is an N×L matrix with the (p, q) element being $e^{-j2\pi(p-1)(q-2)/N}$, and wherein $h^r$ and $h^d$ respectively represent the vector of the channel impulse responses from the source node 10 to the relaying system 20 and from the relaying system 20 to the destination node 30, and wherein $w^d$ is an N×1 vector consisted of the noises at the destination node 30, and wherein A, D and $W^r$ are N×N diagonal matrixes whose k-th diagonal elements are respectively $\alpha_k$, $d_k$ and $W_k^r$. Further, $y_s^d = U^H A D \mathrm{diag}\{\tilde{U}_{L_r} h^r\} \tilde{U}_{L_d} h^d$ and $y_W^d = U^H A W^r \tilde{U}_{L_d} h^d$ are defined and wherein $y_s^d$ is related to the signal part, and $y_W^d$ is related to the noise part that is transmitted from the relaying system 20 to the destination node 30.

Step S3: Set an expectation function, wherein the result of Equation (4) is input to an expectation setting unit 42 to set an expectation function, and the expectation setting unit 42 operates according to Equation (5):

$$Q'(\Phi|\hat{\Phi}^{(j)}) = E_m[\log p(m, y^d|\Phi)|y^d, \hat{\Phi}^{(i)}]; \qquad (5)$$

wherein $E_m[\bullet]$ represents expectation value calculation to m, and wherein p(•) represents PDF (Probability Density Function), and wherein $\Phi = \{h^r, h^d\}$ is the set of parameters to be estimated, and wherein $\hat{\Phi}^{(j)} = \{\hat{h}^{r,(j)}, \hat{h}^{d,(j)}\}$ is the set of parameters estimated with j numbers of iteration, and wherein $y^d$ is the result obtained from Equation (4) and called the incomplete data, and wherein m is the missing data, and wherein a combination of $\{y^d, m\}$ is selected to function as the complete data and used in Equation (5) to obtain an expectation function.

Step S4: Substitute the probability density function into Equation (5) and simplify it, wherein according to the chain rule of probability, a simplification unit 43 is used to remove the terms independent of $\Phi$, and Equation (5) is simplified into $$Q(\Phi|\hat{\Phi}^{(i)}) = E_m[\log [p(y^d|\Phi, m)] \cdot p(y^d|\hat{\Phi}^{(i)}, m)]$$

and wherein a PDF (Probability Density Function) unit 44 is connected with the simplification unit 43 and supplies probability density functions to the simplification unit 43, and the simplification unit 43 outputs a final simplified Equation (6):

$$Q_1(\Phi|\hat{\Phi}^{(i)}) = \qquad (6)$$

$$\int_{\Omega_m} \{2\mathrm{Re}[(y^d - y_s^d(\Phi))^H y_W^d(\Phi)] - \|y_W^d(\Phi)\|^2 - \|y^d - y_s^d(\Phi)\|^2\} \times$$

$$\exp\left\{-\left(\frac{\|y^d - y_s^d(\hat{\Phi}^{(i)}) - y_W^d(\hat{\Phi}^{(i)})\|^2}{\sigma_{w^d}^2}\right) - \left(\frac{\|m\|^2}{\sigma_w^2}\right)\right\} dm,$$

wherein $\Omega_m$ is the space vector of m.

Step S5: Calculate a closed-form expectation function. It is hard to obtain a closed-form expression via integrating Equation (6). If the maximization processing is directly performed on Equation (6) in each iteration, the calculation will be too complicated to accept. Thus, an expectation function closed-form processing unit 45 is used to simplify Equation (6) into an equivalent closed-form expectation function, which is expressed by Equation (7):

$$Q_2(\Phi|\hat{\Phi}^{(i)}) = \qquad (7)$$

$$-\|y^d - y_s^d(\Phi) - Z(\Phi)\overline{m}(\hat{\Phi}^{(i)})\|^2 - tr\{Z(\Phi) \cdot (\sigma_{w^d}^2 K(\hat{\Phi}^{(i)})) \cdot Z^H(\Phi)\},$$

wherein the present invention defines the N×N matrix $Z(\Phi)$ to be $U^H A \mathrm{diag}\{U_{L_d} h^d\}$, and defines average vector $\overline{m}(\hat{\Phi}^{(i)})$ of the N×1 vector to be $K(\hat{\Phi}^{(i)}) \times Z^H(\hat{\Phi}^{(i)}) \times (y^d - y_s^d(\hat{\Phi}^{(i)}))$, and defines the N×N covariance matrix $K(\hat{\Phi}^{(i)})$ to be $[Z^H(\hat{\Phi}^{(i)}) Z(\hat{\Phi}^{(i)}) + (\sigma_{w^d}^2/\sigma_W^2) I]^{-1}$.

Step S6: Perform maximization processing, wherein a maximization processing unit 46 is used to perform the maximization processing on Equation (7), which is expressed in a closed form, and the maximization processing unit 46 performs the maximization processing according to Equation (8):

$$\hat{\Phi}^{(j+1)} = \operatorname*{argmax}_{\Phi \in \Omega} Q_2(\Phi | \hat{\Phi}^{(j)}), \quad (8)$$

wherein $\Omega$ is the space vector of $\Phi$.

It should be explained particularly that the present invention solves equations by an ECM (Expectation Conditional Maximization) algorithm, wherein only one estimated parameter ($h^r$ or $h^d$) of $\Phi$ is updated each time,
and wherein $$\hat{h}^{r,(i+1)} = (S_r^H(\hat{\Phi}^{(i)})S_r(\hat{\Phi}^{(i)}))^{-1} S_r^H(\hat{\Phi}^{(i)})(y^d - Z(\Phi)\overline{m}(\hat{\Phi}^{(i)})) \quad (9)$$

and wherein $$\hat{h}^{d,(i+1)} = [S_d^H(\hat{\Phi}^{(i)})S_d(\hat{\Phi}^{(i)}) + \overline{U}_L^H \hat{A}^{(i)H}(\sigma_w d^2 K(\hat{\Phi}^{(i)}))\hat{A}^{(i)}$$
$$\overline{U}_L]^{-1} \times (S_d^H(\hat{\Phi}^{(i)})y^d) \quad (10)$$

and wherein $S_r(\hat{\Phi}^{(i)})$ in Equation (9) and $S_d(\hat{\Phi}^{(i)})$ in Equation (10) are respectively defined to be Equation (11) and Equation (12):

$$S_r(\hat{\Phi}^{(i)}) = U^H(AD\operatorname{diag}\{U_{L_d}\hat{h}^{d,(i)}\})U_{L_r} \quad (11)$$

$$S_d(\hat{\Phi}^{(i)}) = U^H(AD\operatorname{diag}\{U_{L_r}\hat{h}^{r,(i)}\} + AD\operatorname{diag}\{\overline{m}(\hat{\Phi}^{(i)})\})U_{L_d}. \quad (12)$$

and wherein $U_L$ contains the first L column vectors of the DFT (Discrete Fourier Transform) matrix U,
and wherein diag{a} represents a diagonal matrix with vectors a being the diagonal elements.

Step S7: Perform iteration determination, wherein the result $\hat{\Phi}^{(j+1)}$ of the maximization processing unit 46 is returned to the expectation function closed-form processing unit 45 for the next iteration to attain the solution close to the optimal one, and the channel estimation is ended after a predetermined number of iterations is completed.

Figure 4:
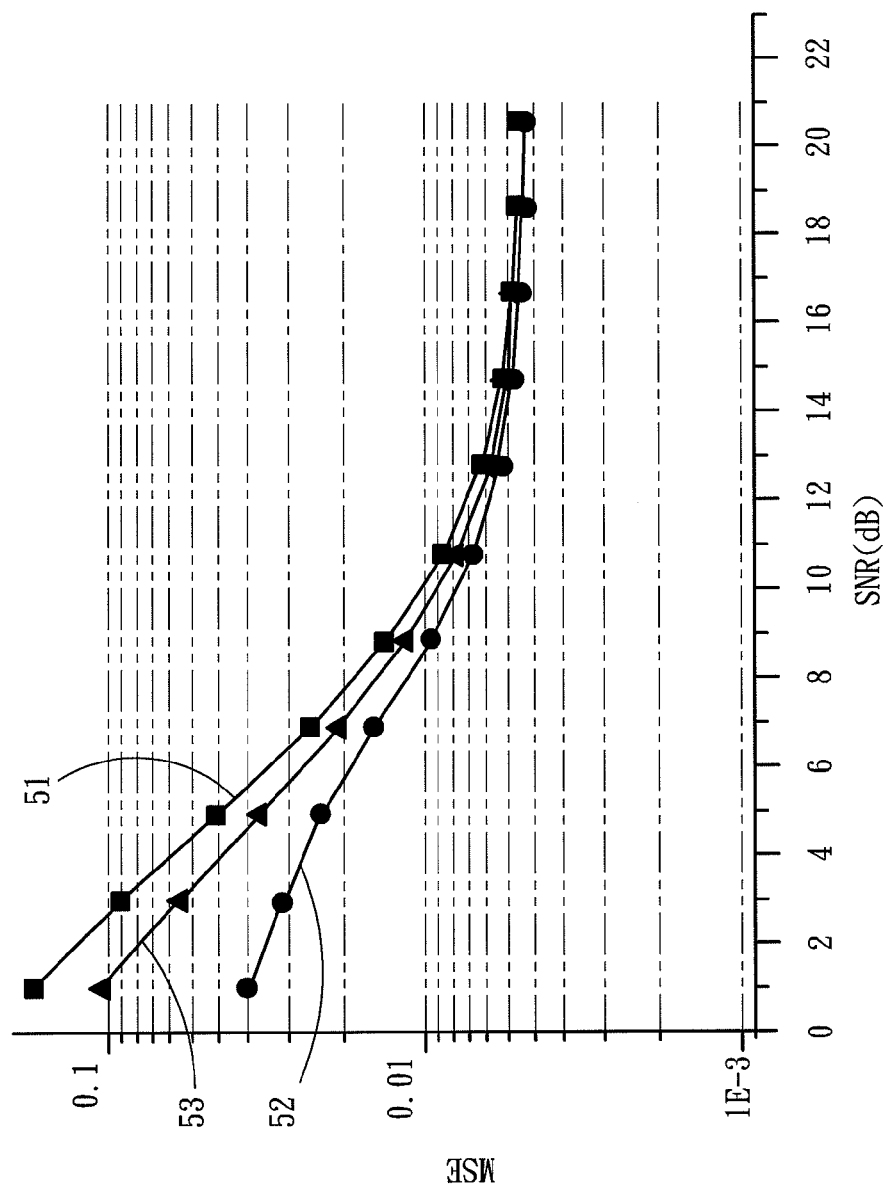
FIG. 4 is a diagram showing the MSE-SNR relationships obtained in the simulation of a channel estimation method for an AF OFDM relaying system according to one embodiment of the present invention.

Refer to FIG. 4 a diagram showing the MSE-SNR relationships obtained in the simulation of a channel estimation method according to one embodiment of the present invention. This embodiment adopts a fixed-gain amplification and constructs the simulation system under the BPSK (Binary Phase Shift Keying) modulation and the OFDM system. Refer to FIG. 1 again. Suppose that the channels are the Rayleigh-fading channels, and the number $L_r$ of the channel impulse response coefficients from the source node 10 to the relaying system 20 and the number $L_d$ of the channel impulse response coefficients from the relaying system 20 to the destination node 30 are set to be 4. Suppose that the error correction code is a convolutional code having a code rate of ½ and a memory length of 4. Suppose that the two-hop channels have identical SNR (Signal-to-Noise Ratio). As shown in FIG. 4, the MSE (Mean Square Error) of the source-to-relay channel 51 is inferior to that of the relay-to-destination channel 52 in lower SNR values. When the SNR value increases, the difference there gradually decreases. The average of them is represented by a curve 53. It is also found in FIG. 4 that the error floor is $4 \times 10^{-3}$. Therefore, the present invention can respectively estimate the channels from the source node 10 to the relaying system 20 and from the relaying system 20 to the destination node 30.

Figure 5:
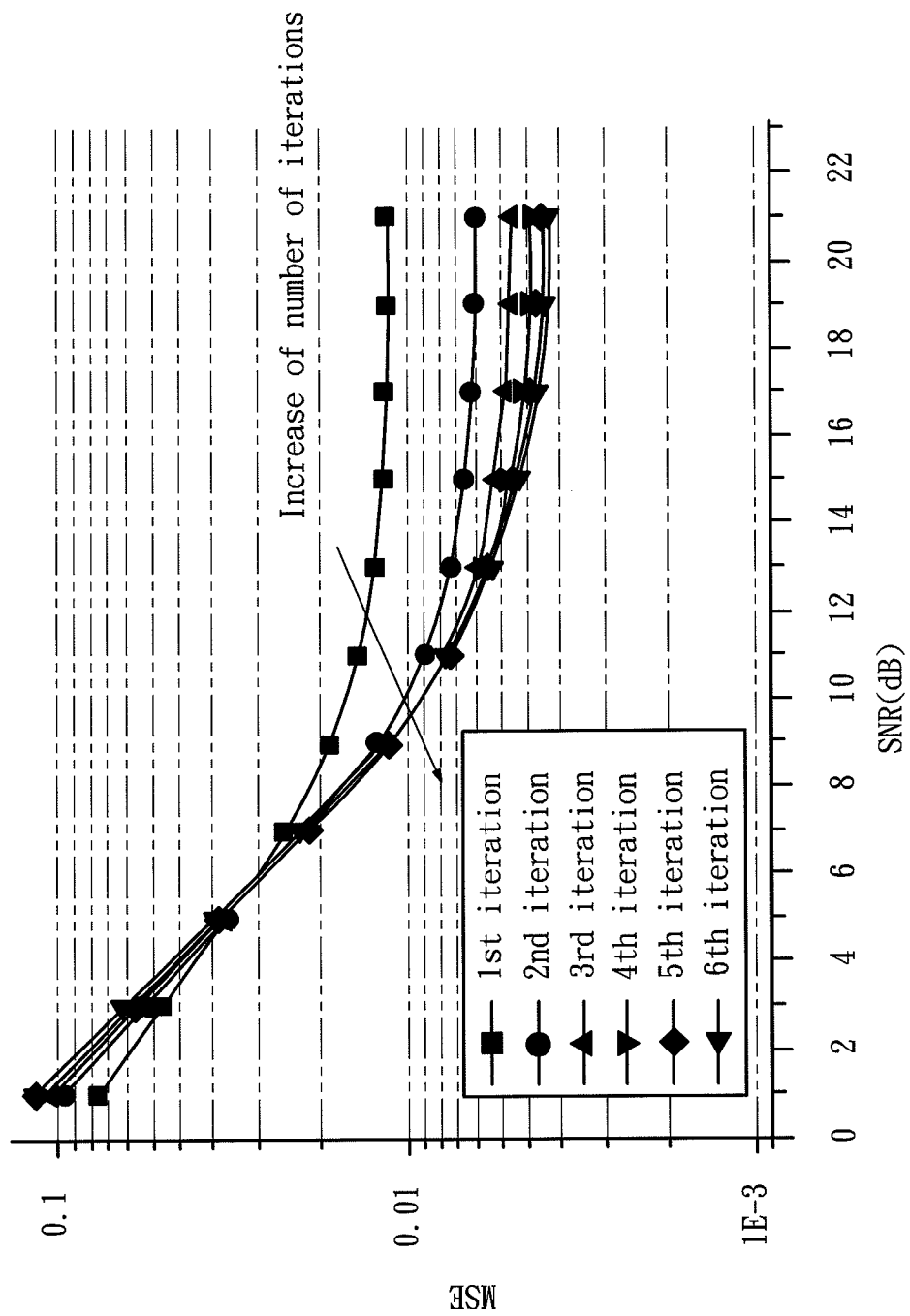
FIG. 5 is a diagram showing the MSE-SNR relationships of different iteration numbers according to one embodiment of the present invention.
Figure 6:
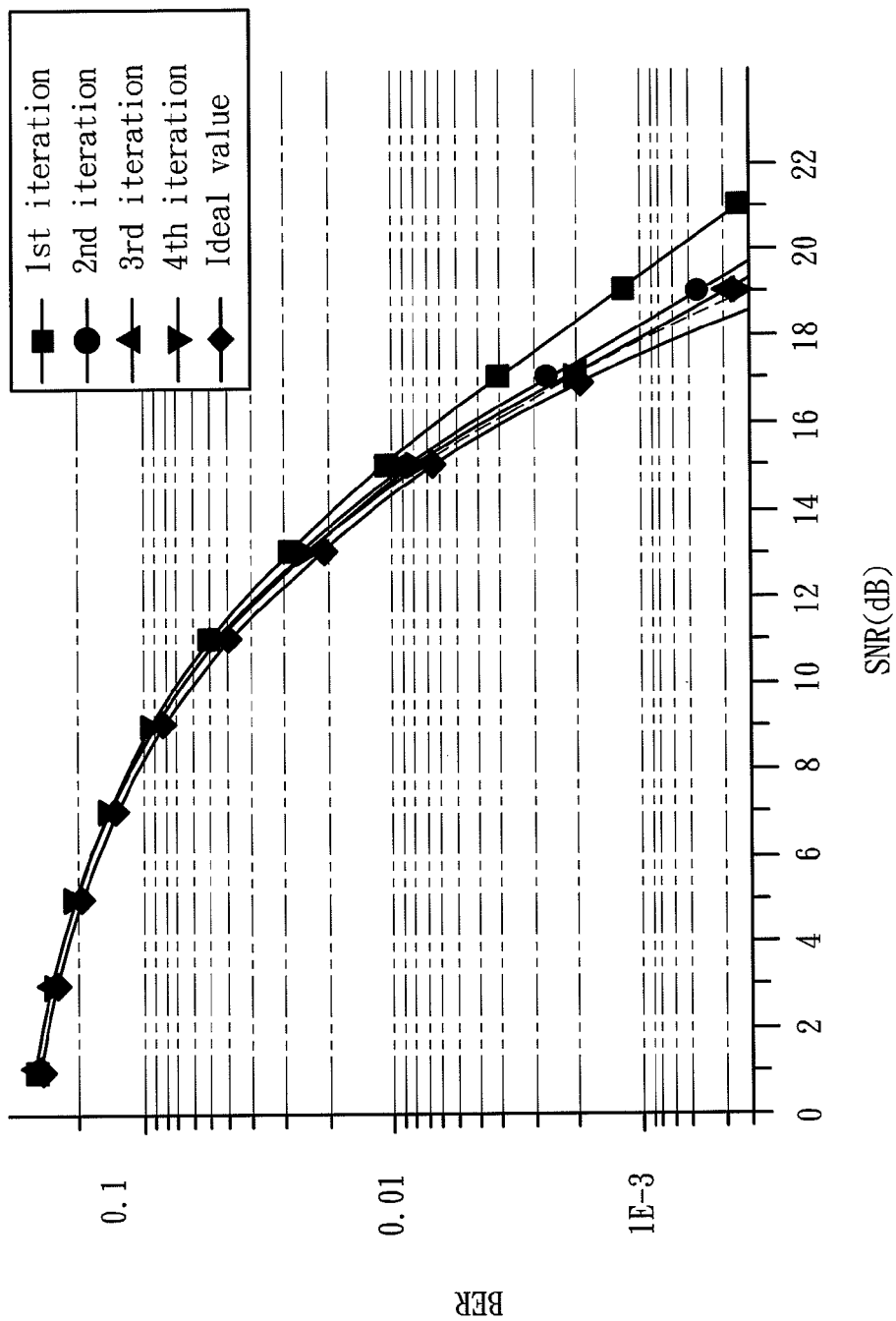
FIG. 6 is a diagram showing the BER-SNR relationships of different iteration numbers according to one embodiment of the present invention.

Refer to FIG. 5 a diagram showing the MSE-SNR relationships of different numbers of iterations. When the numbers of iterations increase, the results gradually converge. When the number of iteration is more than 3, the results almost converge to a fixed value. Refer to FIG. 6. When the numbers of iterations increase, the results will very approach to the ideal value. At a bit error rate of $1 \times 10^{-3}$, the simulation result of the present invention only lose 0.5 dB of SNR comparing with the ideal channel.

Figure 7:
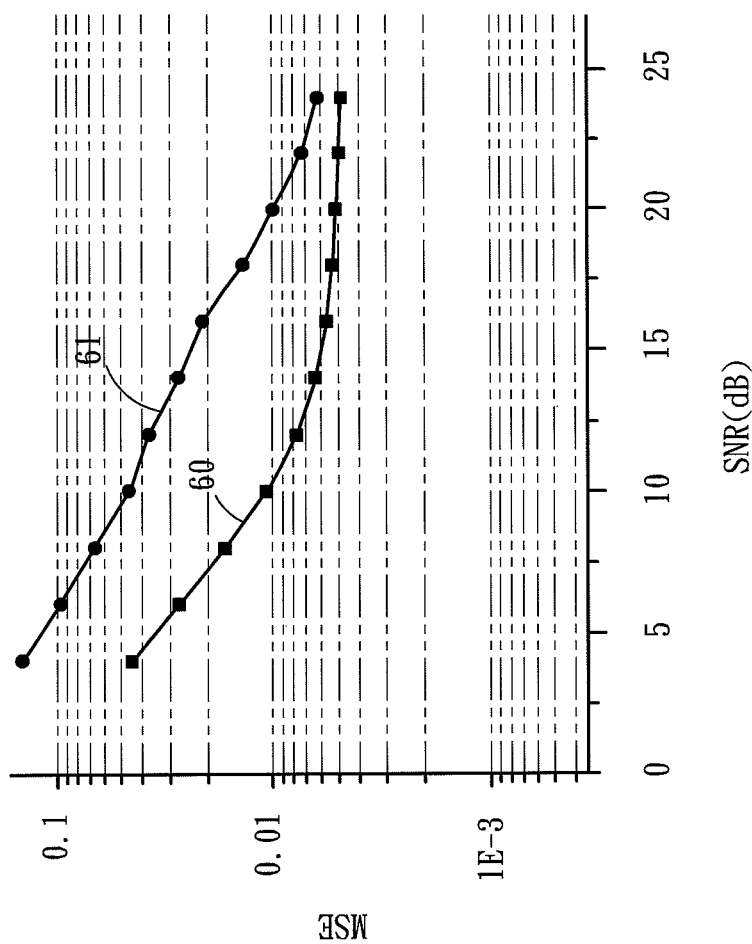
FIG. 7 is a diagram showing the comparison of the MSE-SNR relationships between the present invention and a conventional technology.
Figure 8:
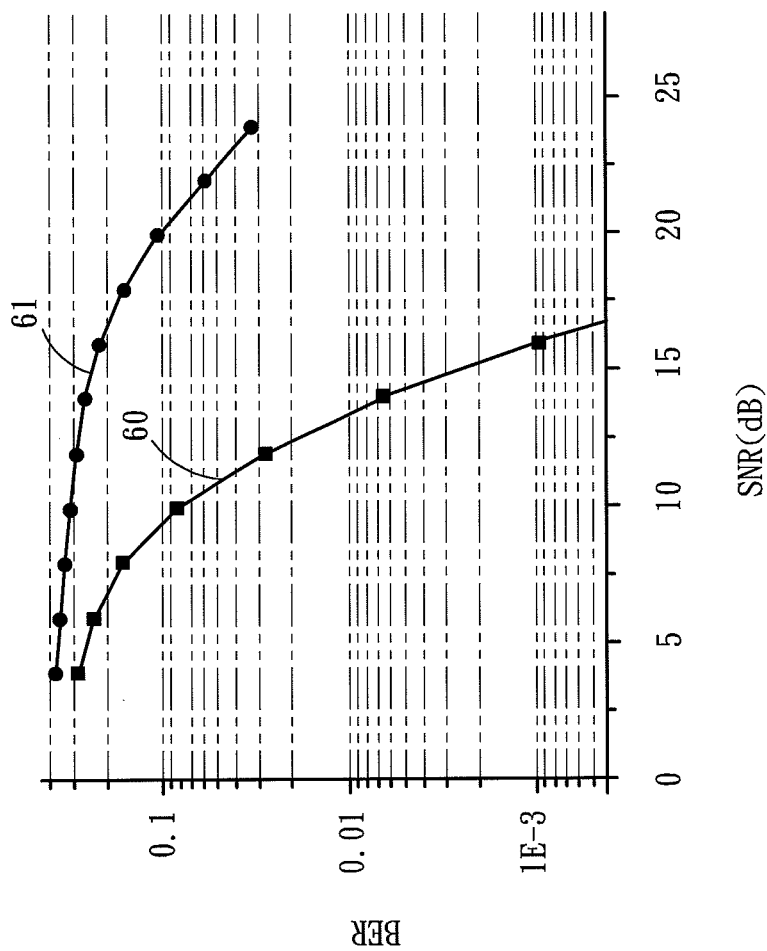
FIG. 8 is a diagram showing the comparison of the BER-SNR relationships between the present invention and a conventional technology.

Refer to FIG. 7, wherein the simulation is undertaken under a 16-PSK system. When MSE is $6 \times 10^{-3}$, the simulation result of MRC (Maximum Ratio Combining)-based diversity combining 60 of the present invention has an SNR superior to that of the conventional technology 61 by 10 dB. Refer to FIG. 8. The simulation result of MRC-based diversity combining 60 of the present invention also obviously outperforms the conventional technology 61 in the bit error rate. Therefore, the present invention is a method of utility.

In conclusion, the present invention proposes a channel estimation method for an AF OFDM relaying system, which is based on an EM (Expectation Maximization) algorithm, wherein the channel impulse responses of a two-hop path from the source node 10 to the relaying system 20 and from the relaying system 20 to the destination node 30 are respectively estimated at the destination node 30. Thus a system can determine the quality of the cascade channels in a two-hop path according to the channel state information and the proposed algorithm and decide the appropriate transmitted data rate. Besides, the present invention needn't calculate MIP (Multipath Intensity Profile) and thus can effectively reduce resource consumption. Further, the present invention can be applied to the MRC (Maximum Ratio Combining)-based diversity combining and has improved MSE and SNR over the conventional technology.

What is claimed is:

1. A channel estimation method for an OFDM (Orthogonal Frequency Division Multiplexing) relaying system, which is based on an EM (Expectation Maximization) algorithm and applied to an AF (Amplify-and-Forward) OFDM relaying system, wherein channels from a source node to a relaying system and from the relaying system to a destination node in a wireless communication system are respectively estimated at the destination, wherein the channel estimation method comprises steps of:

constructing a system model, wherein the channels from the source node to the relaying system and from the relaying system to the destination node are respectively constructed, and wherein a matrix-form unit converts signals into a matrix form for channel estimation, and the signal received by the destination node is expressed by $$y_n^d = \sum_{l=0}^{L_d-1} h_l^d x_{n-l}^r + w_n^d$$

$$= \frac{1}{\sqrt{N}} \sum_{k=0}^{N-1} \left( \sum_{l=0}^{L_d-1} h_l^d e^{-j2\pi kl/N} \right) \left( \sum_{l'=0}^{L_r-1} h_{l'}^r e^{-j2\pi kl'/N} \right) \alpha_k d_k e^{j2\pi kn/N} +$$

$$\frac{1}{\sqrt{N}} \sum_{k=0}^{N-1} \left( \sum_{l=0}^{L_d-1} h_l^d e^{-j2\pi kl/N} \right) \alpha_k W_k^r e^{j2\pi kn/N} + w_n^d, \quad 0 \leq n \leq N-1;$$

setting an expectation function, wherein an expectation setting unit sets the expectation function;

performing maximization processing, wherein a maximization processing unit performs the maximization processing on the expectation function; and performing iteration, wherein a result of the maximization processing unit is returned to the expectation setting unit for an iteration to modify the expectation function until a predetermined number of iterations is completed.

2. The channel estimation method for an OFDM relaying system according to claim 1, wherein the signal output by the source node in the system model is expressed by $$x_n = (1/\sqrt{N})\sum_{k=0}^{N-1} d_k e^{j2\pi kn/N}, \quad 0 \le n \le N-1.$$

3. The channel estimation method for an OFDM relaying system according to claim 2, wherein the signal received by the relaying system in the system model is expressed by $$y_n^r = \sum_{l=0}^{L_r-1} h_l^r x_{n-l} + w_n^r = \left(\frac{1}{\sqrt{N}}\right)\sum_{k=0}^{N-1} H_k^r d_k e^{j2\pi kn/N} + w_n^r,$$

$$0 \le n \le N-1.$$

4. The channel estimation method for an OFDM relaying system according to claim 1, wherein the matrix-form unit simulates the channel with an equation expressed by $$y^d = [y_0^d, y_1^d, \ldots, y_{N-1}^d]^T$$
$$= U^H AD\text{diag}\{\tilde{U}_{L_r} h^r\}\tilde{U}_{L_d} h^d + U^H AW^r \tilde{U}_{L_d} h^d + w^d.$$

5. The channel estimation method for an OFDM relaying system according to claim 4, wherein $$y_s^d = U^H AD\text{diag}\{\tilde{U}_{L_r} h^r\}\tilde{U}_{L_d} h^d, \text{ and}$$

$$y_w^d = U^H AW^r \tilde{U}_{L_d} h^d.$$

6. The channel estimation method for an OFDM relaying system according to claim 1, wherein the expectation setting unit sets an expectation value according to an equation:

$$Q'(\Phi|\hat{\Phi}^{(i)}) = E_m[\log p(m, y^d|\Phi)|y^d, \hat{\Phi}^{(i)}]$$

wherein $y^d$ is incomplete data and m is missing data corresponding to $y^d$, and the incomplete data and the missing data are combined to form complete data.

7. The channel estimation method for an OFDM relaying system according to claim 1 further comprising a step of performing simplification through substituting probability density functions, wherein a simplification unit performs simplification according to a chain rule of probability, and wherein a PDF (Probability Density Function) unit is connected with the simplification unit and supplies the probability density functions to the simplification unit.

8. The channel estimation method for an OFDM relaying system according to claim 7, wherein an expectation function closed-form processing unit is connected with the simplification unit and performs closed form processing for simplified data output by the simplification unit.

* * * * *